United States Patent
Marchya et al.

(10) Patent No.: US 10,623,683 B1
(45) Date of Patent: Apr. 14, 2020

(54) METHODS AND APPARATUS FOR IMPROVING IMAGE RETENTION

(71) Applicant: QUALCOMM Incorporated, San Diego, CA (US)

(72) Inventors: Dileep Marchya, Hyderabad (IN); Dhaval Kanubhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/537,352

(22) Filed: Aug. 9, 2019

(51) Int. Cl.
  H04N 5/57 (2006.01)
  H04N 9/64 (2006.01)
  H04N 9/77 (2006.01)

(52) U.S. Cl.
  CPC ...................... *H04N 5/57* (2013.01)

(58) Field of Classification Search
  CPC ... H04N 5/57; H04N 9/64; H04N 9/77; G06T 1/20; G06T 5/40; G06T 5/001; G06K 9/38
  USPC .............. 348/576, 577, 712, 713, 708, 687; 345/501, 589, 590; 382/270, 274; 375/240.26, 240.27
  See application file for complete search history.

(56) References Cited

U.S. PATENT DOCUMENTS

| 8,009,963 B2 * | 8/2011 | Panda ................ H04N 19/117 348/712 |
| 2008/0056608 A1 | 3/2008 | Spahn |
| 2012/0008695 A1 * | 1/2012 | Wu ...................... H04N 19/176 375/240.27 |
| 2014/0375704 A1 | 12/2014 | Bi et al. |
| 2016/0343301 A1 | 11/2016 | Choi et al. |
| 2017/0004753 A1 | 1/2017 | Kim et al. |
| 2019/0080666 A1 | 3/2019 | Chappalli et al. |

* cited by examiner

*Primary Examiner* — Sherrie Hsia
(74) *Attorney, Agent, or Firm* — Arent Fox, LLP

(57) ABSTRACT

The present disclosure relates to methods and apparatus for video processing. Aspects of the present disclosure can identify one or more macroblocks (MBs) in a frame including a static luminance. In some aspects, the static luminance can be a luminance value that is static for a time period. Aspects of the present disclosure can also determine whether at least one MB of the one or more MBs includes the static luminance for a time period greater than or equal or a luminance threshold duration. Also, the present disclosure can adjust the luminance value of the at least one MB based on the determination whether the at least one MB includes the static luminance for a time period greater than or equal or the luminance threshold duration. Further, the present disclosure can store, as static luminance information, the determination whether the at least one MB includes the static luminance.

30 Claims, 6 Drawing Sheets

METHODS AND APPARATUS FOR IMPROVING IMAGE RETENTION

TECHNICAL FIELD

The present disclosure relates generally to processing systems and, more particularly, to one or more techniques for video or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a video processor, a video processing unit (VPU), a video coder/decoder (codec), a graphics processing unit (GPU), or a display processor. The apparatus can identify one or more macroblocks (MBs) in a frame including a static luminance. In some aspects, the static luminance can be a luminance value that is static for a time period. The apparatus can also determine whether at least one MB of the one or more MBs includes the static luminance for a time period greater than or equal to a luminance threshold duration. In some aspects, the at least one MB can include a reference position. The apparatus can also determine whether the at least one MB is skip marked from the reference position. Also, the apparatus can adjust the luminance value of the at least one MB based on the determination whether the at least one MB includes the static luminance for a time period greater than or equal to the luminance threshold duration. Further, the apparatus can store, as static luminance information, the determination whether the at least one MB includes the static luminance for a time period greater than or equal to the luminance threshold duration. The apparatus can also send the static luminance information to a display, a display processing unit (DPU), or a video decoder of a video coder/decoder (codec). The apparatus can also decrease the luminance value of the at least one MB when the at least one MB includes the static luminance for a time period greater than or equal to the luminance threshold duration. Additionally, the apparatus also increase the luminance value of the at least one MB when the luminance value of the at least one MB is decreased. The apparatus can also determine whether the static luminance information for the at least one MB is substantially equal to previous static luminance information for the at least one MB. The apparatus can also skip identifying the one or more MBs in a frame including a static luminance when the one or more MBs are in an intraframe (I-frame). Further, the apparatus can analyze the adjusted luminance value of the at least one MB and/or stop adjusting the luminance value of the at least one MB when the adjusted luminance value of the at least one MB is greater than or equal to a threshold adjustment value.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
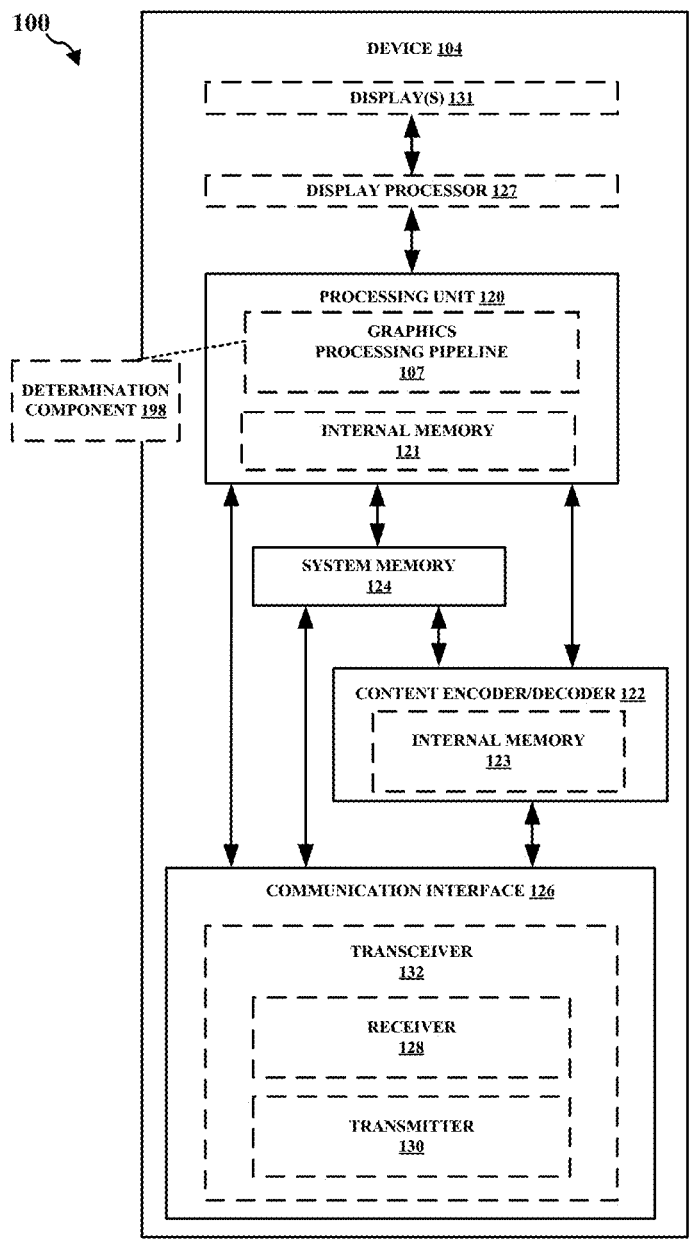
FIG. 1 is a block diagram that illustrates an example content generation system in accordance with one or more techniques of this disclosure.

Some aspects of burn-in compensation may implement techniques at the display side. This may result in the burn-in compensation being less accurate and/or using an unnecessary amount of power. However, aspects of the present disclosure can implement burn-in compensation at the source side of a video processing pipeline. For instance, aspects of the present disclosure can implement burn-in compensation at a video codec, a video encoder, a video decoder, or a VPU, e.g., to more efficiently implement burn-in compensation. Indeed, the burn-in compensation techniques herein can result in burn-in compensation with increased accuracy and/or reduced power consumption. For example, burn-in compensation techniques herein can identify one or more pixels or MBs in a frame including a static luminance. Burn-in compensation techniques herein can determine whether at least one MB of the one or more MBs includes the static luminance for a time period greater than or equal to a luminance threshold duration. Also, burn-in compensation techniques herein can adjust the luminance value of the at least one MB based on the determination whether the at least one MB includes the static luminance for a time period greater than or equal to the luminance threshold duration.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to identify one or more MBs in a frame including a static luminance, where the static luminance can be a luminance value that is static for a time period. The determination component 198 can also be configured to determine whether at least one MB of the one or more MBs includes the static luminance for a time period greater than or equal to a luminance threshold duration. In some aspects, the at least one MB can include a reference position. The determination component 198 can also be configured to determine whether the at least one MB is skip marked from the reference position. The determination component 198 can also be configured to adjust the luminance value of the at least one MB based on the determination whether the at least one MB includes the static luminance for a time period greater than or equal to the luminance threshold duration. The determination component 198 can also be configured to store, as static luminance information, the determination whether the at least one MB includes the static luminance for a time period greater than or equal to the luminance threshold duration. The determination component 198 can also be configured to send the static luminance information to a display, a display processing unit (DPU), or a video decoder of a video coder/decoder (codec). The determination component 198 can also be configured to decrease the luminance value of the at least one MB when the at least one MB includes the static luminance for a time period greater than or equal to the luminance threshold duration. The determination component 198 can also be configured to increase the luminance value of the at least one MB when the luminance value of the at least one MB is decreased. The determination component 198 can also be configured to determine whether the static luminance information for the at least one MB is substantially equal to previous static luminance information for the at least one MB. The determination component 198 can also be configured to skip identifying the one or more MBs in a frame including a static luminance when the one or more MBs are in an intraframe (I-frame). Further, the determination component 198 can be configured to analyze the adjusted luminance value of the at least one MB and/or stop adjusting the luminance value of the at least one MB when the adjusted luminance value of the at least one MB is greater than or equal to a threshold adjustment value.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled.

As these modes or states can change, GPUs may need to change the corresponding context. Additionally, the workload that corresponds to the mode or state may follow the changing mode or state.

Some aspects of displays or display panels, e.g., organic light emitting diode (OLED) displays, can suffer a number of problems due to the prolonged display of pixels including the same or static luminance intensity. In some aspects, these pixels with a static luminance can occur in the same portion of the frame or display. For example, displays can suffer 'image retention' or 'burn-in' when an image or portion of an image remains on the screen or display for a prolonged period of time. Accordingly, when a group of pixels has a static luminance, these pixels may be retained or burnt into the image. Also, image retention or burn-in can occur after a particular portion of an image should have disappeared. In some instances, this can be a common problem in OLED displays, where static pixels in a certain area of the screen may cause an image retention or burn-in in the area containing the static pixels.

Areas of a display or screen that infrequently or sporadically change their pixel luminance values can also age faster in comparison to the areas of the display or screen that produce more random colors or luminance values. Therefore, portions of the image or screen that display static images are likely to observe higher instances of image retention or burn-in than areas that change luminance values more frequently. For example, the portion of a display or screen with certain static images, e.g., a logo, subtitles, icons, navigation bar, and/or notification bar, can be more likely to observe higher rates of image retention or burn-in.

A number of different approaches can be taken in order to mitigate the image retention or burn-in experienced by a screen or display. For example, a display can avoid leaving static images on the screen for long periods of time, turn down the brightness by selecting a dimmer picture mode, select fading animation effects, or minimize the chances of uneven wear by performing a screen shift. A screen shift is also known as a pixel shift, which can move an image slightly around the screen or display. Also, there can be a pixel shifting algorithms that continuously shift the pixels in certain portions of the screen. Further, a user or display can periodically run or perform a pixel refresher, which move or adjust different colors or luminance values around the screen or display.

In some aspects, there may be a high probability of a display or screen remaining on a constant brightness for long period of time. For example, video streaming and/or gaming applications may include a high probability of image retention or burn-in. In some instances, gaming applications may generate more dynamic colors compared to video streaming, so there may be a lower probability of retaining static images. Likewise, videos or video streaming may have a higher probability of retaining static images, such as in news streaming, video calling, or displays with channel logos. As such, certain areas of screens or displays in video streaming, e.g., a logo in the corner of an image, may have a higher probability of image retention or retaining static images.

In addition, static pixel or macroblock (MB) detection and/or pixel luminance adjustment can be a resource intensive process. Moreover, static pixel or MB determination for video streaming use cases may utilize repeated or redundant processing, e.g., as the same video may be consumed by many users or displays. As mentioned above, this image retention or burn-in problem in video streaming applications can occur within a variety of displays or screens, e.g., OLED displays. As further indicated herein, a MB can be a group of pixels. For example, a MB can be a group of pixels including a number of different dimensions, e.g., 8 by 8 pixels, 16 by 16 pixels, or 32 by 32 pixels.

Figure 2:
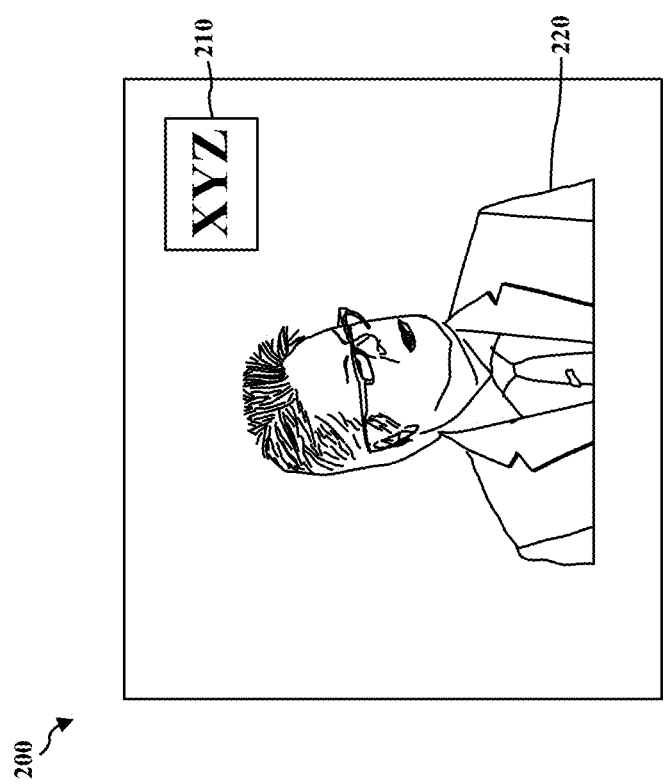
FIG. 2 illustrates an example frame in accordance with one or more techniques of this disclosure.
Figure 3:
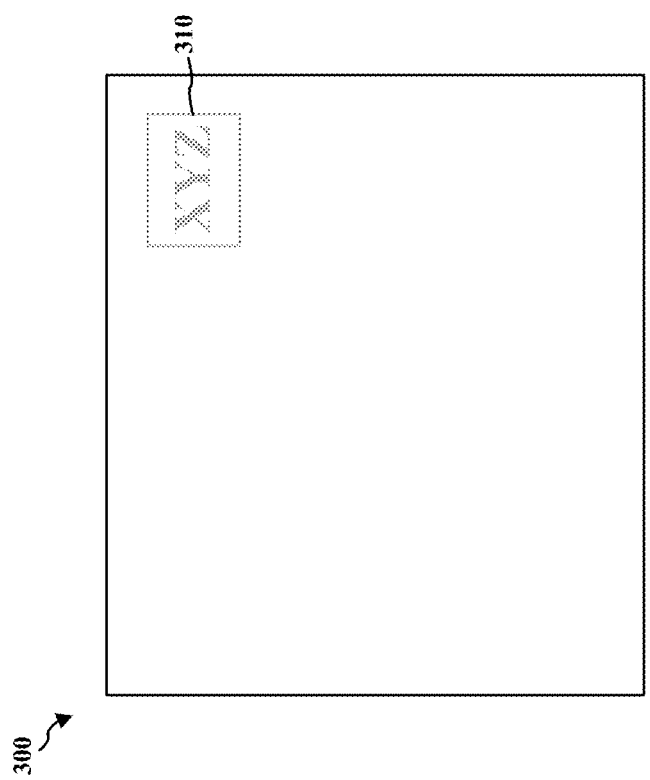
FIG. 3 illustrates an example frame in accordance with one or more techniques of this disclosure.

FIGS. 2 and 3 illustrate example frames 200 and 300, respectively. For example, FIGS. 2 and 3 display consecutive frames in a display. In FIG. 2, frame 200 includes corner image 210 and center image 220. In FIG. 3, frame 300 includes corner image 310. FIG. 2 displays that the center image 220 may refresh or change frequently. However, corner image 210 is a logo that is static and changes relatively infrequently. FIGS. 2 and 3 display that corner image 210 in frame 200 experiences image retention or burn-in, which results in corner image 310 in frame 300. Accordingly, corner image 310 in frame 300 displays one example of image retention or burn-in. For example, the luminance value of the pixels in corner image 210 is static for a prolonged period of time and results in the corner image 310 being retained or burnt into the screen. Indeed, the logo in corner image 310 remains in the display after the corner image 210 and center image 220 disappear from the display.

As indicated herein, aspects of the present disclosure may attempt to solve the image retention or burn-in problem, e.g., when one pixel or area remains in a constant image or brightness for a prolonged period of time. As mentioned above, in OLED displays for video streaming cases, the image may remain on one area of the screen for a prolonged period of time, e.g., when displaying a logo. Some aspects may include an instruction at the display to not leave certain pixels on the same luminance or intensity for a certain duration of time. Therefore, some aspects of displays may remove a static image after a designated period of time. Other aspects may attempt to solve image retention or burn-in by utilizing screen shifting, e.g., changing or adjusting a pixel color or brightness in a certain area of the display. In some aspects, the present disclosure may solve image retention or burn-in at the video coding or source side of a video processing pipeline, e.g., at a VPU or video codec.

Aspects of the present disclosure may compensate for image retention or burn-in for pixels or MBs including a static luminance beyond a certain threshold duration. For example, aspects of the present disclosure may skip pixels or MBs including a static luminance until that static luminance reaches a threshold duration. This burn-in compensation can occur during a number of different processes at the source side of a video processing pipeline, e.g., a VPU, a video codec, an encoder of a video codec, or a decoder of a video codec. Aspects of the present disclosure can utilize the burn-in compensation at other processing units as well, e.g., a GPU.

As mentioned herein, aspects of the present disclosure can implement the image retention or burn-in compensation at the source side of the video processing pipeline. Accordingly, aspects of the present disclosure can solve the aforementioned burn-in issues at the video codec (coder/decoder) or VPU level. Further, the present disclosure can utilize the image retention solutions for video playback use cases, which in some instances may be playback use cases over an increased period of time. Aspects of the present disclosure can also utilize the aforementioned burn-in compensation for pixels or MBs in a frame that repeat a luminance value, i.e., marked to skip a luminance refresh or skip-marked, beyond a certain threshold. For example, this can occur during video encoding or decoding. Some aspects of the present disclosure can propose an algorithm at the video encoding or decoding level. Aspects of the present disclosure can also identify or create multiple groups of pixels or MBs for an image, e.g., a 32×32 group of pixels.

In some aspects, the present disclosure can identify MBs that are skip-marked repeatedly from the same reference frame, i.e., static reference MBs. So the present disclosure can identify which MBs have been marked to be skipped at a luminance refresh for a subsequent frame. For instance, a video codec can identify or mark groups of pixels or MBs as skip-marked pixels or MBs. In some instances, a video codec can identify the same image in a previous reference frame. For example, if frame n and frame n−1 have the same pixels or MBs in the same position, then the video codec may mark each of these pixels or MBs to be skipped, i.e., skip-mark the pixels or MBs. In some aspects, the static or skip-marked MBs can have a high probability of displaying the same intensity pixels.

As mentioned above, the present disclosure can identify groups of pixels or MBs that are skip-marked repeatedly, e.g., from the same reference frame. In some aspects, the present disclosure can avoid doing any compression on these skip-marked MBs, but a similar skip-marked MB can be identified from a reference frame or consecutive frame. Additionally, the present disclosure can ignore intra-only frames (I-frames) during this process. An I-frame can be part of a coded picture in which all slices of the frame are an intra-only frame slice.

Also, aspects of the present disclosure can identify static groups of pixels or MBs beyond a threshold time limit or duration, e.g., greater than or equal to 5 seconds. Aspects of the present disclosure can also unify neighboring static pixel groups or MBs, e.g., to create a group of target pixels or MBs. As such, if there are multiple static groups of pixels or MBs in a frame, the present disclosure can track these static groups of pixels or MBs.

In some aspects, the present disclosure can also create and analyze a map or histogram of the target MBs or groups of pixels. Analyzing a histogram can provide the present disclosure with certain information, e.g., how many pixels of a certain luminance or color intensity are in a certain MB or pixel group. For instance, the present disclosure can subtract or eliminate low luminance MBs from a luminance pixel map, i.e., the present disclosure can drop MBs that do not contribute to image retention. By doing so, the present disclosure can determine which groups of pixels or MBs are in a retention state.

Analyzing a histogram or map of luminance values can also inform the present disclosure how many pixels or MBs should be dropped from a skip-mark map. For instance, once the present disclosure determines which pixels or MBs are in a retention state, it can start reducing the luminance, e.g., at the video codec level. As such, the present disclosure can solve the issue of image retention or burn-in at the source side, e.g., the video codec or VPU level. In some aspects, the present disclosure can solve the issue of image retention or burn-in at the source side rather than the destination side, e.g., display level. By doing so, when the video codec or VPU is providing an output to the display, it can include the pixels or MBs that have been adjusted due to the image retention or burn-in compensation. For example, the present disclosure can include pixels or MBs without any static retention.

Further, aspects of the present disclosure can reduce the pixel luminance of the target pixels or MBs in gradual steps. For example, the present disclosure can reduce the luminance of pixels or MBs over a certain time period, e.g., over several seconds, such that the luminance change may not be perceived by a user. Accordingly, once the present disclosure identifies the pixel luminance is the same for a group of pixels or MBs, it can adjust or decrease the pixel luminance or intensity of the static pixels or target MBs. As mentioned herein, the present disclosure can adjust the pixel luminance at the source side or video codec level. In some aspects, the luminance value for a groups of pixels or MBs can be reduced until a defined level, e.g., reduced from 255 to 200 lumens. Also, the present disclosure can apply edge smoothening filters for the target pixels or MBs.

In some aspects, the present disclosure can inverse or change the pixel luminance reduction, such as by increasing the pixel luminance for a group of pixels or MBs. Accordingly, aspects of the present disclosure can increase and/or decrease the pixel luminance of pixels or MBs to implement image retention or burn-in compensation. For example, if the luminance value is too high for certain pixels or MBs, the present disclosure can decrease the luminance value. In contrast, if the luminance value is too low for certain pixels or MBs, the present disclosure can increase the luminance value.

Additionally, aspects of the present disclosure can analyze a histogram or map of pixels or MBs that may not be skip-marked. For example, if a current histogram or map of pixels or MBs has a close match with a previous histogram or map, the present disclosure can increase or decrease the luminance value of the pixels or MBs in a gradual manner, e.g., to avoid any abrupt change in luminance value. In some instances, the present disclosure may stop the luminance value compensation process for the group of pixels or MBs if the histogram or pixel map is different from a previous histogram or map.

Moreover, aspects of the present disclosure can determine and/or store burn-in compensation or luminance information, e.g., as part of video frame metadata. This process can occur at the source side, e.g., during video encoding or decoding. Accordingly, once the pixel luminance information is adjusted, the present disclosure can store the information and/or send the information to a display.

In some instances, the video codec can provide this luminance information or supplemental enhancement information, e.g., the frame rate information or any information regarding the frame, in video frame metadata. As such, this frame information can be determined or provided by the video codec or VPU. For example, the luminance information can identify that the video codec has fixed the static pixel or burn-in issue for a group of pixels or MBs in a frame. By doing so, the luminance information may inform another unit in a video processing pipeline, e.g., a VPU or display unit, that it should not run any static pixel algorithm or perform any CPU processing work to fix the burn-in issue. By doing so, the present disclosure can save processing work at the display side. Accordingly, at least one benefit or advantage of the present disclosure is to save time and/or processing power by performing the burn-in determination at the source or video codec side.

In some aspects, after decoding the frame or luminance information, the present disclosure can send the video frame metadata to a display unit. This information can be used or passed into the display subsystem, e.g., to stop burn-in detection at the display side and maintain the processing level. So the present disclosure can utilize the luminance information from the video codec to shut down any image retention or burn-in detection on the display side in order to save power.

In some aspects, the present disclosure can restart the above pixel luminance compensation steps for a subsequent frame, e.g., the next instantaneous decoding refresh (IDR)

frame. In some instances, an IDR frame can clear the reference buffer or frame buffer, such that no frame after the IDR frame can reference any frame before IDR frame. However, this may not necessarily be the case for an I-frame. For instance, the video codec may allow the IDR frame to be triggered at a certain time period, e.g., every 2 or 5 seconds. Also, IDR frames may not include any of the previous coding information for frames. As indicated herein, the present disclosure can be implemented in video codecs, e.g., encoders or decoders.

Figure 4:
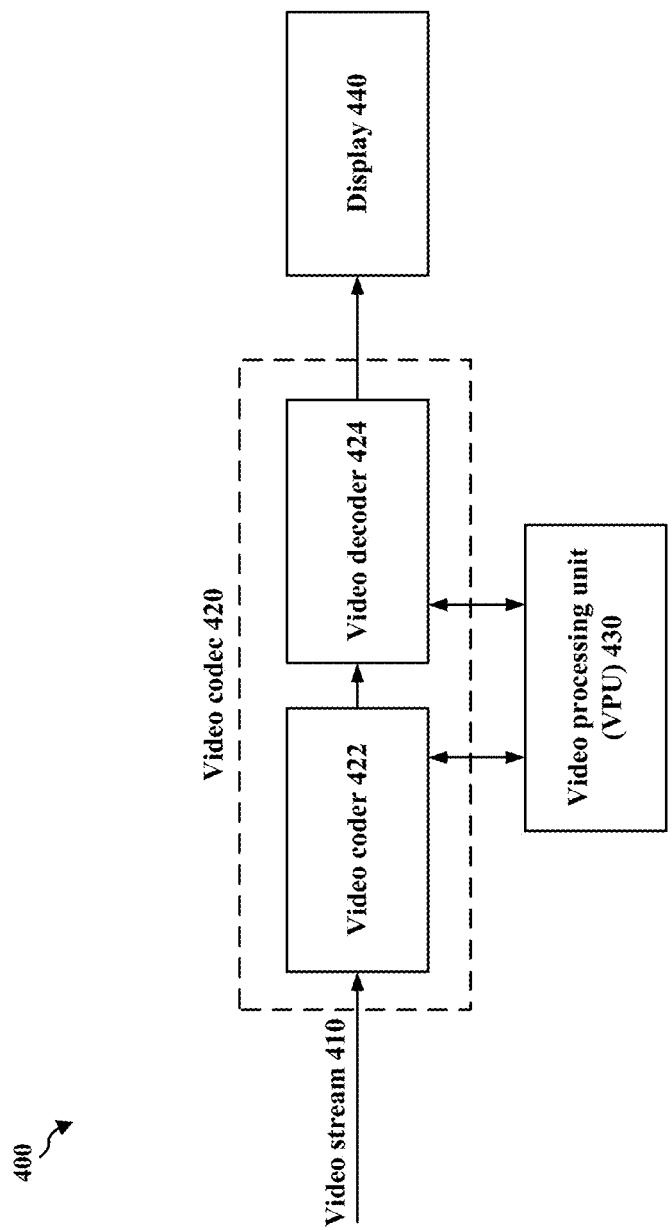
FIG. 4 illustrates an example video processing pipeline in accordance with one or more techniques of this disclosure.

FIG. 4 illustrates an example video processing pipeline 400 in accordance with one or more techniques of this disclosure. Video processing pipeline 400 includes video stream 410, video codec 420 including video coder 422 and video decoder 424, video processing unit (VPU) 430, and display 440. As mentioned above, aspects of the present disclosure can perform the burn-in detection process at one or more units in the video processing pipeline 400, e.g., the video codec 420 or VPU 430.

For example, video codec 420 can identify one or more pixels or MBs in a frame, e.g., a group of pixels or MB, that have a static luminance. Video codec 420 can also determine whether at least one pixel or MB of the one or more pixels or MBs includes a static luminance greater than or equal to a threshold time duration, e.g., longer than 5 seconds. This determination information can be stored as luminance information, e.g., in the video codec 420. Additionally, the video codec 420 can adjust or reduce the luminance value of the at least one pixel or MB including a static luminance greater than or equal to a threshold time duration.

In some instances, the aforementioned burn-in detection process at the source side, e.g., video codec or VPU, can provide advantages over running the burn-in detection at the display side. For instance, when an image is received at the display side, the pixel or frame display reference time may have already occurred. After this, the display may attempt to fix the static pixel. So the display side may attempt to fix the static pixels at the user display, which may result in a high CPU processing rate.

In contrast, at the codec side, the image is available earlier in the process. As such, the codec can use the information at a lower CPU processing rate. By doing so, the codec can fix the static pixels or MBs and still adhere to a certain display pipeline timing. Indeed, the CPU processing rate may not increase when the video codec fixes the static pixels or MBs. Accordingly, the present disclosure can implement the pixel adjustment from the video codec or source side, while still utilizing the same amount of CPU power from the display side.

Aspects of the present disclosure can repeat the aforementioned burn-in compensation steps to continuously determine which pixels or MBs are static and remain at a certain luminance threshold. So the burn-in compensation algorithm can be repeated to optimize the burn-in reduction. Also, the burn-in compensation can be implemented at the video codec, e.g., at the encoder or decoder side. In some instances, when the video codec is generating a video clip, e.g., with the coder or encoder, it can adjust the static pixels or MBs. Further, the video codec can adjust the static pixels or MBs with the decoder when it is generating the reference frame. In some aspects, one of the encoder or decoder may need to implement the aforementioned burn-in compensation.

As mentioned herein, aspects of the present disclosure can be implemented at the source side of a video processing pipeline, e.g., by a video codec, an encoder, a decoder, or a VPU. For instance, if a video stream is coming from a server, the server can implement the burn-in compensation at the source side. Aspects of the present disclosure can also implement the burn-in compensation at a VPU or video codec, e.g., through the video decoder. For example, the VPU or video codec can implement the burn-in compensation during the rendering process. In some aspects the VPU or video codec may need a reference frame to implement the burn-in compensation, as the video stream may have a reference frame. For instance, a video codec, an encoder, a decoder, or a VPU may include the reference frame. Additionally, as mentioned above, identifying a group of pixels or MBs can reduce the amount of work performed by the video codec. For example, a histogram or pixel map including the determined luminance information may include information from multiple pixels or MBs, which can be analyzed a single instance in order to save time and/or power.

Figure 5:
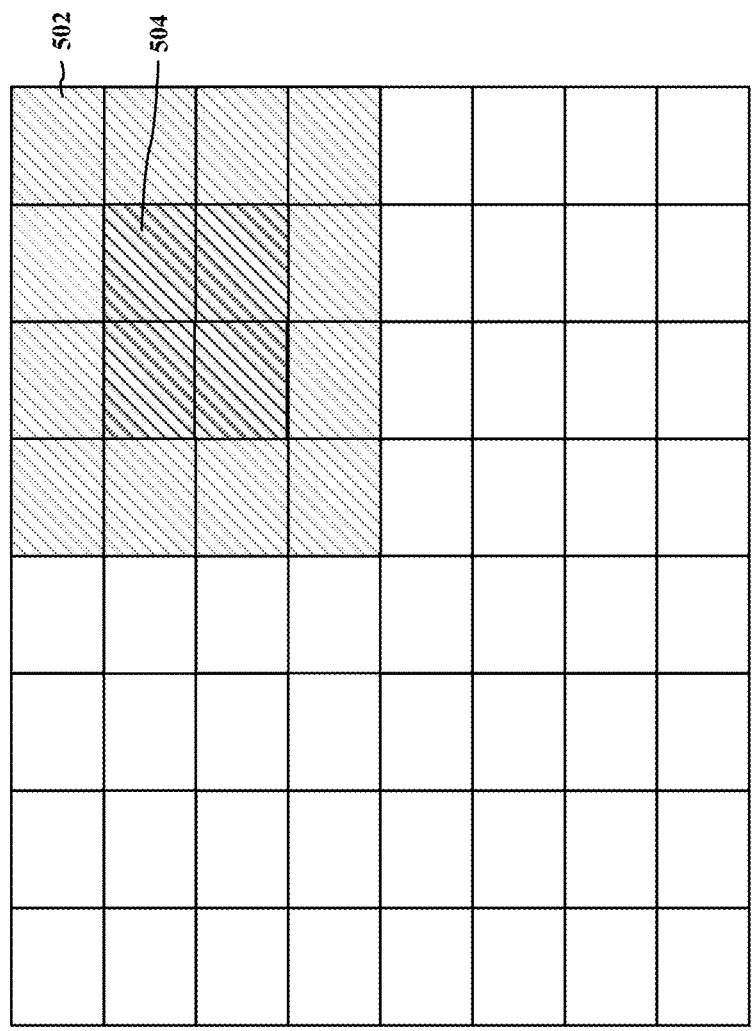
FIG. 5 illustrates an example frame in accordance with one or more techniques of this disclosure.

FIG. 5 illustrates an example frame 500 in accordance with one or more techniques of this disclosure. Frame 500 includes first MBs or pixels 502 and second MBs or pixels 504. First MBs 502 include the group of MBs with the diagonal lines, including the gray and black diagonal lines. Second MBs 504 include the group of MBs with the black diagonal lines, but not the gray diagonal lines. Accordingly, each of the second MBs 504 are included in the first MBs 502. However, some first MBs 502 are not included in the second MBs 504. First MBs 502 include the group of MBs in frame 500 that include a static luminance value. Second MBs 504 include the group of MBs in frame 500 that include a static luminance value for a time duration of greater than or equal to a luminance threshold.

FIG. 5 displays one aspect of the pixel or MB identification process for the aforementioned burn-in compensation. As mentioned herein, the burn-in compensation shown in FIG. 5 can be implemented at the source side of a video processing pipeline, e.g., by a video codec, an encoder, a decoder, or a VPU. As shown in FIG. 5, aspects of the present disclosure can identify one or more MBs, e.g., first MBs 502, in a frame, e.g., frame 500, including a static luminance. In some aspects, the static luminance can be a luminance value that is static for a time period. Also, each of the one or more MBs, e.g., first MBs 502, may include a group of pixels.

Aspects of the present disclosure can also determine whether at least one MB, e.g., second MBs 504, of the one or more MBs, e.g., first MBs 502, includes the static luminance for a time period greater than or equal to a luminance threshold duration. In some aspects, the luminance threshold duration may be 5 seconds. Aspects of the present disclosure can also determine whether the static luminance information for the at least one MB, e.g., second MBs 504, is substantially equal to previous static luminance information for the at least one MB, e.g., second MBs 504. In some aspects, each of the one or more MBs can include a reference position. Aspects of the present disclosure can also determine whether the at least one MB, e.g., second MBs 504, is skip marked, e.g., from the reference position.

As shown in FIG. 5, aspects of the present disclosure can also adjust the luminance value of the at least one MB, e.g., second MBs 504, based on the determination whether the at least one MB, e.g., second MBs 504, includes the static luminance for a time period greater than or equal to the luminance threshold duration. In some aspects, the luminance value of the at least one MB, e.g., second MBs 504, can be adjusted by a video codec or video processing unit. Aspects of the present disclosure can also decrease the luminance value of the at least one MB, e.g., second MBs 504, when the at least one MB, e.g., second MBs 504, includes the static luminance for a time period greater than or equal to the luminance threshold duration. Additionally, aspects of the present disclosure can increase the luminance value of the at least one MB, e.g., second MBs 504, when the luminance value of the at least one MB, e.g., second MBs 504, is decreased.

Further, as shown in FIG. 5, aspects of the present disclosure can store, as static luminance information, the determination whether the at least one MB, e.g., second MBs 504, includes the static luminance for a time period greater than or equal to the luminance threshold duration. In some aspects, the static luminance information can be stored at a video processing unit, a video codec, or a GPU. Aspects of the present disclosure can also send the static luminance information to a display, a display processing unit (DPU), or a video decoder of a video codec. Moreover, the static luminance information can be sent in video frame metadata.

As shown in FIG. 5, aspects of the present disclosure can also skip identifying the one or more MBs, e.g., first MBs 502, in a frame including a static luminance when the one or more MBs are in an intraframe (I-frame). In some aspects, when an MB is identified as skip marked, it can be marked to be skipped, as it includes a static luminance. Thus, as the luminance of the MB does not need to be updated, it is marked as skipped. Aspects of the present disclosure can also analyze the adjusted luminance value of the at least one MB, e.g., second MBs 504.

Also, aspects of the present disclosure can stop adjusting the luminance value of the at least one MB, e.g., second MBs 504, when the adjusted luminance value of the at least one MB, e.g., second MBs 504, is greater than or equal to a threshold adjustment value. In some aspects, the adjusted luminance value of the at least one MB, e.g., second MBs 504, can be analyzed based on at least one histogram. Also, the threshold adjustment value can be based on at least one other histogram. In some aspects, aspects of the present disclosure can skip identifying the one or more MBs in a frame, e.g., first MBs 502, including a static luminance when the one or more MBs are in an intraframe (I-frame).

Figure 6:
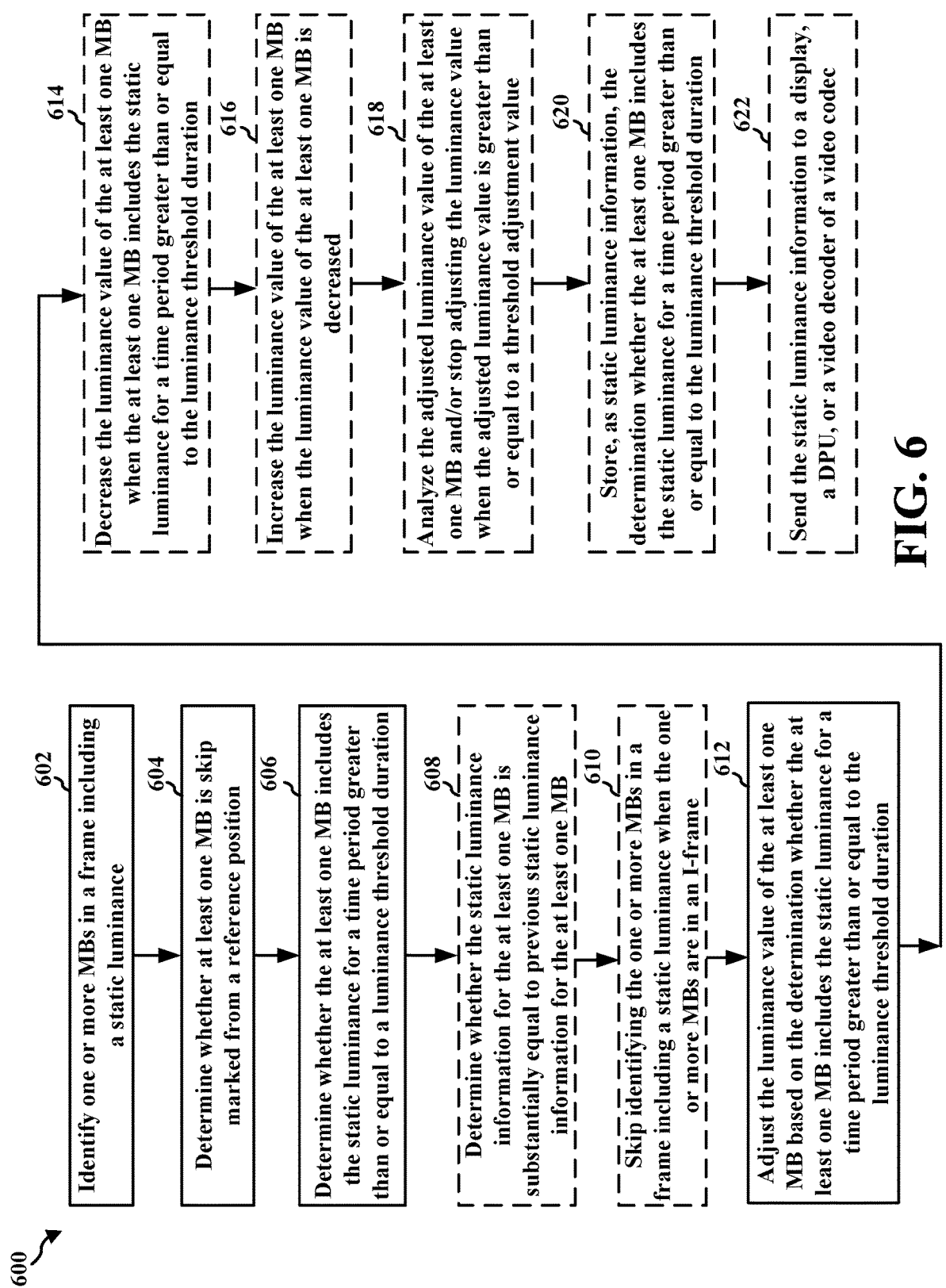
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by an apparatus such as a video codec, a video encoder, a video decoder, a VPU, a GPU or an apparatus for video processing. At 602, the apparatus may identify one or more MBs in a frame including a static luminance, as described in connection with the examples in FIGS. 2, 3, 4, and 5. In some aspects, the static luminance can be a luminance value that is static for a time period, as described in connection with the examples in FIGS. 2, 3, 4, and 5. Also, each of the one or more MBs may include a group of pixels, as described in connection with the examples in FIGS. 2, 3, 4, and 5.

In some aspects, each of the one or more MBs can include a reference position, as described in connection with the examples in FIGS. 2, 3, 4, and 5. At 604, the apparatus can determine whether at least one MB of the one or more MBs is skip marked from the reference position, as described in connection with the examples in FIGS. 2, 3, 4, and 5.

At 606, the apparatus can determine whether the at least one MB includes the static luminance for a time period greater than or equal to a luminance threshold duration, as described in connection with the examples in FIGS. 2, 3, 4, and 5. In some aspects, the luminance threshold duration may be 5 seconds, as described in connection with the examples in FIGS. 2, 3, 4, and 5. At 608, the apparatus can also determine whether the static luminance information for the at least one MB is substantially equal to previous static luminance information for the at least one MB, as described in connection with the examples in FIGS. 2, 3, 4, and 5. At 610, the apparatus can skip identifying the one or more MBs in a frame including a static luminance when the one or more MBs are in an intraframe (I-frame), as described in connection with the examples in FIGS. 2, 3, 4, and 5.

At 612, the apparatus can adjust the luminance value of the at least one MB based on the determination whether the at least one MB includes the static luminance for a time period greater than or equal to the luminance threshold duration, as described in connection with the examples in FIGS. 2, 3, 4, and 5. In some aspects, the luminance value of the at least one MB can be adjusted by a video codec or video processing unit, as described in connection with the examples in FIGS. 2, 3, 4, and 5. At 614, the apparatus can decrease the luminance value of the at least one MB when the at least one MB includes the static luminance for a time period greater than or equal to the luminance threshold duration, as described in connection with the examples in FIGS. 2, 3, 4, and 5. At 616, the apparatus can increase the luminance value of the at least one MB when the luminance value of the at least one MB is decreased, as described in connection with the examples in FIGS. 2, 3, 4, and 5.

At 618, the apparatus can analyze the adjusted luminance value of the at least one MB and/or stop adjusting the luminance value of the at least one MB when the adjusted luminance value of the at least one MB is greater than or equal to a threshold adjustment value, as described in connection with the examples in FIGS. 2, 3, 4, and 5. In some aspects, the adjusted luminance value of the at least one MB can be analyzed based on at least one histogram, and the threshold adjustment value can be based on at least one other histogram, as described in connection with the examples in FIGS. 2, 3, 4, and 5.

At 620, the apparatus can store, as static luminance information, the determination whether the at least one MB includes the static luminance for a time period greater than or equal to the luminance threshold duration, as described in connection with the examples in FIGS. 2, 3, 4, and 5. In some aspects, the static luminance information can be stored at a video processing unit, a video codec, or a GPU, as described in connection with the examples in FIGS. 2, 3, 4, and 5. At 622, the apparatus can send the static luminance information to a display, a display processing unit (DPU), or a video decoder of a video codec, as described in connection with the examples in FIGS. 2, 3, 4, and 5. Moreover, the static luminance information can be sent in video frame metadata, as described in connection with the examples in FIGS. 2, 3, 4, and 5.

In one configuration, a method or apparatus for graphics processing is provided. The apparatus may be a video codec, a video encoder, a video decoder, a VPU, a GPU or some other processor that can perform video processing. In one aspect, the apparatus may be the processing unit 120 within the device 104, or may be some other hardware within device 104 or another device. The apparatus may include means for identifying one or more MBs in a frame including a static luminance, where the static luminance is a luminance value that is static for a time period. The apparatus may also include means for determining whether at least one MB of the one or more MBs includes the static luminance for a time period greater than or equal to a luminance threshold duration. The apparatus may also include means for adjusting the luminance value of the at least one MB based on the determination whether the at least one MB includes the static luminance for a time period greater than or equal to the luminance threshold duration. The apparatus may also include means for storing, as static luminance information, the determination whether the at least one MB includes the static luminance for a time period greater than or equal to the luminance threshold duration. The apparatus may also include means for sending the static luminance information to a display, a display processing unit (DPU), or a video decoder of a video codec. The apparatus may also include means for decreasing the luminance value of the at least one MB when the at least one MB includes the static luminance for a time period greater than or equal to the luminance threshold duration. The apparatus may also include means for increasing the luminance value of the at least one MB when the luminance value of the at least one MB is decreased. The apparatus may also include means for determining whether the static luminance information for the at least one MB is substantially equal to previous static luminance information for the at least one MB. The apparatus may also include means for determining whether the at least one MB is identified as skip marked from the reference position. The apparatus may also include means for analyzing the adjusted luminance value of the at least one MB. The apparatus may also include means for stopping adjusting the luminance value of the at least one MB when the adjusted luminance value of the at least one MB is greater than or equal to a threshold adjustment value. The apparatus may also include means for skipping identifying the one or more MBs in a frame including a static luminance when the one or more MBs are in an intraframe (I-frame).

The subject matter described herein can be implemented to realize one or more benefits or advantages. For instance, the described video and/or graphics processing techniques can be used by a video codec, a video encoder, a video decoder, a VPU, a GPU, or some other processor that can perform video processing to more efficiently implement burn-in compensation. This can also be accomplished at a low cost compared to other video or graphics processing techniques. Moreover, the video or graphics processing techniques herein can improve or speed up data processing or execution. Further, the video or graphics processing techniques herein can improve resource or data utilization and/or resource efficiency. Additionally, aspects of the present disclosure can utilize burn-in compensation that can reduce the CPU power consumption. The aforementioned techniques can result in burn-in compensation with increased accuracy, reduced time utilization, and/or reduced power consumption.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:
1. A method of video processing, comprising:
identifying one or more macroblocks (MBs) in a frame including a static luminance, wherein the static luminance is a luminance value that is static for a time period, wherein each of the one or more MBs includes a reference position;
determining whether at least one MB of the one or more MBs is skip marked from the reference position;
determining whether the at least one MB includes the static luminance for a time period greater than or equal to a luminance threshold duration; and
adjusting the luminance value of the at least one MB based on the determination whether the at least one MB includes the static luminance for a time period greater than or equal to the luminance threshold duration.
2. The method of claim 1, further comprising:
storing, as static luminance information, the determination whether the at least one MB includes the static luminance for a time period greater than or equal to the luminance threshold duration.

3. The method of claim 2, further comprising:
sending the static luminance information to a display, a display processing unit (DPU), or a video decoder of a video coder/decoder (codec).

4. The method of claim 3, wherein the static luminance information is sent in video frame metadata.

5. The method of claim 2, further comprising:
determining whether the static luminance information for the at least one MB is substantially equal to previous static luminance information for the at least one MB.

6. The method of claim 2, wherein the static luminance information is stored at a video processing unit, a video codec, or a graphics processing unit (GPU).

7. The method of claim 1, wherein adjusting the luminance value of the at least one MB further comprises:
decreasing the luminance value of the at least one MB when the at least one MB includes the static luminance for a time period greater than or equal to the luminance threshold duration.

8. The method of claim 7, wherein adjusting the luminance value of the at least one MB further comprises:
increasing the luminance value of the at least one MB when the luminance value of the at least one MB is decreased.

9. The method of claim 1, wherein the luminance value of the at least one MB is adjusted by a video codec.

10. The method of claim 1, wherein each of the one or more MBs include a group of pixels.

11. The method of claim 1, wherein the luminance threshold duration is 5 seconds.

12. The method of claim 1, further comprising:
skipping identifying the one or more MBs in a frame including a static luminance when the one or more MBs are in an intraframe (I-frame).

13. The method of claim 1, further comprising:
analyzing the adjusted luminance value of the at least one MB; and
stopping adjusting the luminance value of the at least one MB when the adjusted luminance value of the at least one MB is greater than or equal to a threshold adjustment value.

14. The method of claim 13, wherein the adjusted luminance value of the at least one MB is analyzed based on at least one histogram, wherein the threshold adjustment value is based on at least one other histogram.

15. An apparatus for video processing, comprising:
a memory; and
at least one processor coupled to the memory and configured to:
identify one or more macroblocks (MBs) in a frame including a static luminance, wherein the static luminance is a luminance value that is static for a time period, wherein each of the one or more MBs includes a reference position;
determine whether at least one MB of the one or more MBs is skip marked from the reference position;
determine whether the at least one MB includes the static luminance for a time period greater than or equal to a luminance threshold duration; and
adjust the luminance value of the at least one MB based on the determination whether the at least one MB includes the static luminance for a time period greater than or equal to the luminance threshold duration.

16. The apparatus of claim 15, wherein the at least one processor is further configured to:
store, as static luminance information, the determination whether the at least one MB includes the static luminance for a time period greater than or equal to the luminance threshold duration.

17. The apparatus of claim 16, wherein the at least one processor is further configured to:
send the static luminance information to a display, a display processing unit (DPU), or a video decoder of a video coder/decoder (codec).

18. The apparatus of claim 17, wherein the static luminance information is sent in video frame metadata.

19. The apparatus of claim 16, wherein the at least one processor is further configured to:
determine whether the static luminance information for the at least one MB is substantially equal to previous static luminance information for the at least one MB.

20. The apparatus of claim 16, wherein the static luminance information is stored at a video processing unit, a video codec, or a graphics processing unit (GPU).

21. The apparatus of claim 15, wherein to adjust the luminance value of the at least one MB comprises the at least one processor further configured to:
decrease the luminance value of the at least one MB when the at least one MB includes the static luminance for a time period greater than or equal to the luminance threshold duration.

22. The apparatus of claim 21, wherein to adjust the luminance value of the at least one MB comprises the at least one processor further configured to:
increase the luminance value of the at least one MB when the luminance value of the at least one MB is decreased.

23. The apparatus of claim 15, wherein the luminance value of the at least one MB is adjusted by a video codec.

24. The apparatus of claim 15, wherein each of the one or more MBs include a group of pixels.

25. The apparatus of claim 15, wherein the luminance threshold duration is 5 seconds.

26. The apparatus of claim 15, wherein the at least one processor is further configured to:
skip identifying the one or more MBs in a frame including a static luminance when the one or more MBs are in an intraframe (I-frame).

27. The apparatus of claim 15, wherein the at least one processor is further configured to:
analyze the adjusted luminance value of the at least one MB; and
stop adjusting the luminance value of the at least one MB when the adjusted luminance value of the at least one MB is greater than or equal to a threshold adjustment value.

28. The apparatus of claim 27, wherein the adjusted luminance value of the at least one MB is analyzed based on at least one histogram, wherein the threshold adjustment value is based on at least one other histogram.

29. An apparatus for video processing, comprising:
means for identifying one or more macroblocks (MBs) in a frame including a static luminance, wherein the static luminance is a luminance value that is static for a time period, wherein each of the one or more MBs includes a reference position;
means for determining whether at least one MB of the one or more MBs is skip marked from the reference position;
means for determining whether the at least one MB includes the static luminance for a time period greater than or equal to a luminance threshold duration; and means for adjusting the luminance value of the at least one MB based on the determination whether the at least one MB includes the static luminance for a time period greater than or equal to the luminance threshold duration.

30. A non-transitory computer-readable medium storing computer executable code for video processing, comprising code to:
- identify one or more macroblocks (MBs) in a frame including a static luminance, wherein the static luminance is a luminance value that is static for a time period, wherein each of the one or more MBs includes a reference position;
- determine whether at least one MB of the one or more MBs is skip marked from the reference position;
- determine whether the at least one MB includes the static luminance for a time period greater than or equal to a luminance threshold duration; and
- adjust the luminance value of the at least one MB based on the determination whether the at least one MB includes the static luminance for a time period greater than or equal to the luminance threshold duration.

\* \* \* \* \*